US012571636B2

(12) United States Patent
Choi et al.

(10) Patent No.: US 12,571,636 B2
(45) Date of Patent: Mar. 10, 2026

(54) METHOD AND DEVICE WITH LANE DETECTION

(71) Applicant: SAMSUNG ELECTRONICS CO., LTD., Suwon-si (KR)

(72) Inventors: Jinhyuk Choi, Suwon-si (KR); Seho Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 18/194,799

(22) Filed: Apr. 3, 2023

(65) Prior Publication Data

US 2024/0142241 A1     May 2, 2024

(30) Foreign Application Priority Data

Nov. 1, 2022    (KR) ........................ 10-2022-0143522

(51) Int. Cl.
   *G06V 20/56*      (2022.01)
   *G01C 21/34*      (2006.01)
   *G06V 10/74*      (2022.01)

(52) U.S. Cl.
   CPC ....... *G01C 21/3415* (2013.01); *G06V 10/761* (2022.01); *G06V 20/588* (2022.01)

(58) Field of Classification Search
   CPC ........................ G06V 20/588; B60W 2552/53; B60W 30/12; B60W 2552/10; B60W 2552/30; G06T 2207/30256
See application file for complete search history.

(56) References Cited

U.S. PATENT DOCUMENTS

| | | | |
|---|---|---|---|
| 10,373,003 B2 | 8/2019 | Liu et al. | |
| 2015/0367781 A1* | 12/2015 | Takemae | G06V 20/588 |
| | | | 348/148 |
| 2019/0073542 A1* | 3/2019 | Sattar | G06T 7/74 |

(Continued)

FOREIGN PATENT DOCUMENTS

| | | |
|---|---|---|
| KR | 10-1225626 B1 | 1/2013 |
| KR | 10-1720679 B1 | 3/2017 |

(Continued)

OTHER PUBLICATIONS

A Template Matching and Ellipse Modeling Approach to Detecting Lane Markers, ACIVS 2010, Part II, LNCS 6475, pp. 179-190 to Borkar et al. (Year: 2010).*

*Primary Examiner* — Kenneth J Malkowski
(74) *Attorney, Agent, or Firm* — NSIP Law

(57) ABSTRACT

A lane detection method and device is disclosed, where the method includes determining main trajectory information based on first trajectory information of one or more dynamic objects around a vehicle and second trajectory information of a surrounding environment of the vehicle, determining one or more candidate lane templates from among lane templates based on the main trajectory information, adjusting the one or more candidate lane templates to generate adjusted lane templates, determining an overlap between a lane feature obtained from an input image and each of the adjusted lane templates through overlapping the lane feature with each of the adjusted lane templates, and determining, as the lane, an overlapping lane template in which an overlap of the lane feature with an adjusted lane template has a greatest similarity.

20 Claims, 11 Drawing Sheets

(56)  References Cited

U.S. PATENT DOCUMENTS

| | | | | |
|---|---|---|---|---|
| 2021/0406561 A1* | 12/2021 | Zhou | ...................... | G06N 3/045 |
| 2022/0164584 A1* | 5/2022 | Singal | ................... | G06V 10/44 |
| 2024/0005673 A1* | 1/2024 | Kagimoto | .............. | G08G 1/167 |

FOREIGN PATENT DOCUMENTS

| | | |
|---|---|---|
| KR | 10-1906951 B1 | 10/2018 |
| KR | 10-2022-0069846 A | 5/2022 |
| WO | WO 2015/116950 A1 | 8/2015 |

* cited by examiner

Frame t

Frame t-1

Frame t-2

Frame t-3

410

Frame t-4

Frame t-5

101

710

101

Lane templates  800

810          820          830          840          850

1010             1020             1030             1040

Lane feature        Adjusted        Overlapping        Bitwise AND
               lane template        lane template       operation result

METHOD AND DEVICE WITH LANE DETECTION

CROSS-REFERENCE TO RELATED APPLICATIONS

This application claims the benefit under 35 USC § 119(a) of Korean Patent Application No. 10-2022-0143522, filed on Nov. 1, 2022, in the Korean Intellectual Property Office, the entire disclosure of which is incorporated herein by reference for all purposes.

BACKGROUND

1. Field

The following disclosure relates to a method and device for lane detection.

2. Description of Related Art

Various technologies are being developed for autonomous driving. For example, a lane departure warning system (LDWS) may identify whether an ego vehicle, i.e., a vehicle having sensors that perceive the environment around the vehicle, is out of a driving lane and an adaptive cruise control (ACC) may automatically control a speed of the ego vehicle by maintaining a distance between the ego vehicle and a vehicle in front. In addition, an advanced driver assistance system (ADAS) and/or an autonomous driving (AD) system may enable a vehicle to recognize and determine some situations while driving by using some combination of a detection sensor, an image processor, a communication device, and the like, and may control an operation of the ego vehicle or notify a driver of the ego vehicle of the situations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method for detecting a lane, the method including determining main trajectory information based on first trajectory information of one or more dynamic objects around a vehicle and second trajectory information of a surrounding environment of the vehicle, determining one or more candidate lane templates from among lane templates based on the main trajectory information, adjusting the one or more candidate lane templates to generate adjusted lane templates, determining an overlap between a lane feature obtained from an input image and each of the adjusted lane templates through overlapping the lane feature with each of the adjusted lane templates, and determining, as the lane, an overlapping lane template in which an overlap of the lane feature with an adjusted lane template has a greatest similarity.

The determining of the main trajectory information may include determining the main trajectory information by combining the first trajectory information with the second trajectory information.

The method may include in response to a plurality of dynamic objects being recognized, determining a movement path of each of the plurality of dynamic objects, and determining the first trajectory information based on each of the determined movement path.

The method may include detecting static points corresponding to a stationary state from radar data obtained through a radar sensor, performing clustering on points having continuity from among the detected static points, and determining the second trajectory information based on the clustering.

The determining of the one or more candidate lane templates may include extracting a parameter related to line fitting from the main trajectory information, and selecting one or more lane templates having a parameter similar to the extracted parameter from among the lane templates as the one or more candidate lane templates.

The generating of the adjusted lane templates may include generating the adjusted lane templates by performing at least one of a transformation or an adjustment, based on a movement of a camera of the vehicle, on the one or more candidate lane templates.

The transformation may include a geometric transformation.

The determining of the overlap may include determining a number of matching pixels between each of the adjusted lane templates and the lane feature, and determining a similarity of the lane feature and each of the generated adjusted lane templates based on the number of matching pixels.

The method may include determining whether a lane type is changed based on second main trajectory information determined after the lane is determined and the adjusted lane template, determining one or more second candidate lane templates from among the lane templates based on the second main trajectory information, in response to the lane type being changed, adjusting the one or more second candidate lane templates to generate second adjusted lane templates, determining an overlap between a second lane feature obtained from a second input image and each of the second adjusted lane templates through overlapping the second lane feature with each of the second adjusted lane templates, and determining, as a second lane, a second overlapping lane template in which an overlap of the second lane feature with a second adjusted lane template has a greatest similarity.

The determining of whether the lane type is changed may include extracting a parameter related to line fitting from the second main trajectory information, determining whether a difference between a parameter related to the line fitting of the adjusted lane template and the extracted parameter is equal to or greater than a threshold, and determining that the lane type is changed, in response to the difference being equal to or greater than the threshold.

The method maintaining the overlapping lane template as the lane, in response to the determination that the lane type is not changed.

The method of may include adding the overlapping lane template to the lane templates, in response to the determining of the lane type being changed.

In one general aspect, there is provided an electronic device including a memory configured to store instructions and lane templates, and a processor configured to execute the instructions to configure the processor to determine main trajectory information based on first trajectory information of one or more dynamic objects around a vehicle and second trajectory information of a surrounding environment of the vehicle, determine one or more candidate lane templates from among the lane templates based on the main trajectory information, adjust the one or more candidate lane templates to generate adjusted lane templates, determine an overlap between a lane feature obtained from an input image and each of the adjusted lane templates through overlapping the lane feature with each of the adjusted lane templates, and determine, as a lane, an overlapping lane template in which an overlap of the lane feature with an adjusted lane template has a greatest similarity.

The processor may be configured to determine the main trajectory information by combining the first trajectory information with the second trajectory information.

In response to a plurality of dynamic objects being recognized, the processor may be configured to determine a movement path of each of the plurality of dynamic objects, and to determine the first trajectory information by aggregating the movement path of each of the plurality of dynamic objects.

The processor may be configured to receive radar data from a radar sensor of the vehicle, detect static points corresponding to a stationary state from the received radar data, cluster points having continuity from among the detected static points, and determine the second trajectory information based on the clustered points.

The processor may be configured to extract a parameter related to line fitting from the main trajectory information, and select one or more lane templates having a parameter similar to the extracted parameter from among the lane templates as the one or more candidate lane templates.

The processor may be configured to generate the adjusted lane templates by performing at least one of a transformation or an adjustment, based on a movement of a camera of the vehicle, on the one or more candidate lane templates.

The processor may be configured to determine a number of matching pixels between each of the adjusted lane templates and the lane feature, and determine a similarity of the lane feature and each of the generated adjusted lane templates based on the number of matching pixels.

The processor may be configured to determine whether a lane type is changed based on second main trajectory information determined after the lane is determined and the adjusted lane template, determine one or more second candidate lane templates from among the lane templates based on the second main trajectory information, in response to the lane type being changed, adjust the one or more second candidate lane templates to generate second adjusted lane templates, determine an overlap between a second lane feature obtained from a second input image and each of the second adjusted lane templates through overlapping the second lane feature with each of the second adjusted lane templates, and determine, as a second lane, a second overlapping lane template in which an overlap of the second lane feature with a second adjusted lane template has a greatest similarity.

The processor may be configured to extract a parameter related to line fitting from the second main trajectory information, determine whether a difference between a parameter related to the line fitting of the adjusted lane template and the extracted parameter is equal to or greater than a threshold value, and determine that the lane type is changed, in response to the difference being equal to or greater than the threshold value.

Other features and aspects will be apparent from the following detailed description, the drawings, and the claims.

Figure 1:
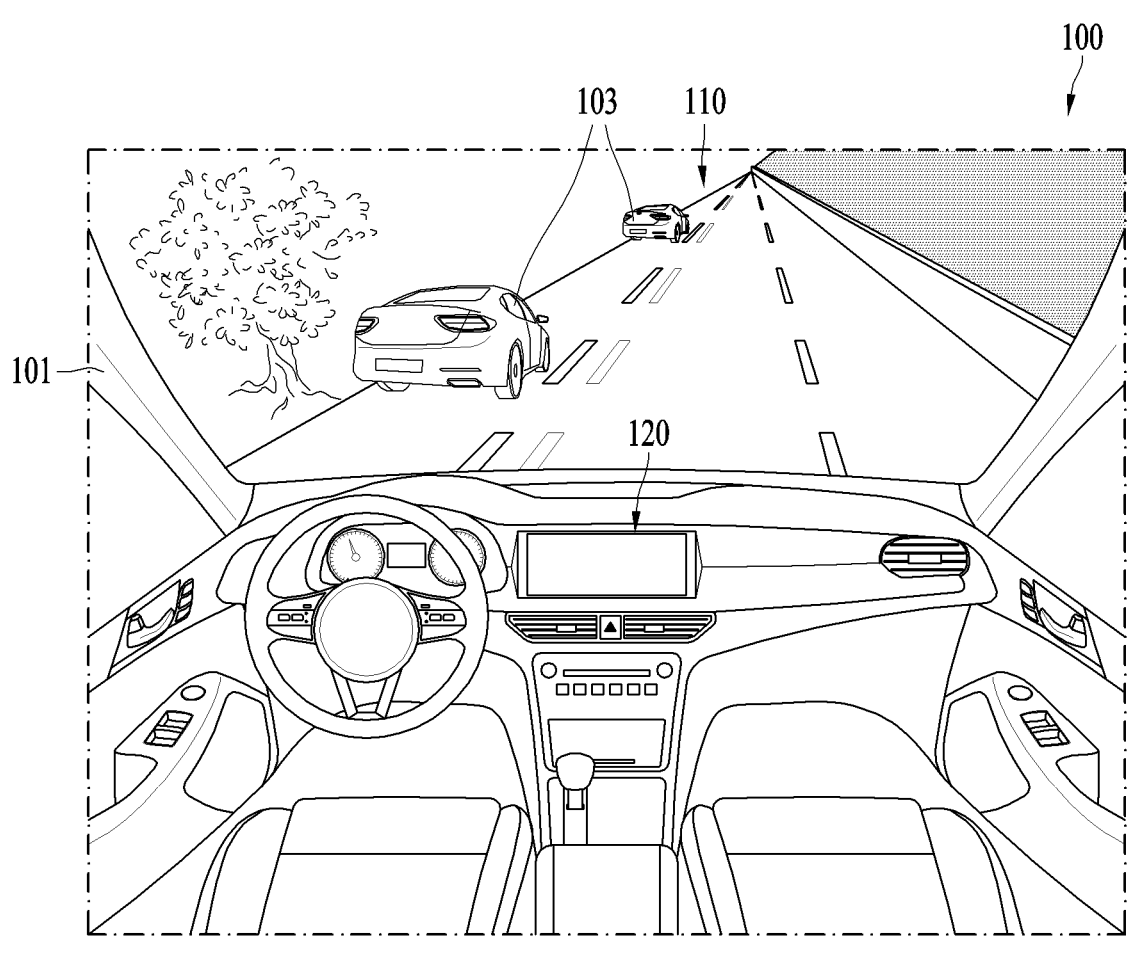
FIG. 1 illustrates an example of performing a method of detecting a lane.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B.".

The singular forms "a," "an," and "the" are Intended to refer to the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. However, the use of the term "may" herein with respect to an example or embodiment, e.g., as to what an example or embodiment may include or implement, means that at least one example or embodiment exists where such a feature is included or implemented, while all examples are not limited thereto.

Unless otherwise defined, all terms used herein including technical or scientific terms have the same meaning as commonly understood by one of ordinary skill in the art to which examples belong and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

The examples described below may be implemented as, or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a vehicle, an autonomous vehicles, an intelligent vehicles, or a smart device. In an example, the computing devices may be a wearable device, such as, for example, a smart watch and an apparatus for providing augmented reality (AR) (hereinafter simply referred to as an AR provision device) such as AR glasses, a head mounted display (HMD), various Internet of Things (IoT) devices that are controlled through a network, and other consumer electronics/information technology (CE/IT) devices.

The examples described below may be used to mark a lane in an augmented reality navigation system of a smart vehicle and the like or generate visual information to assist in the steering of an autonomous vehicle. In addition, the examples may be used to assist safe and comfortable driving by interpreting visual information through a device including an intelligent system, such as a head up display (HUD) that is installed in a vehicle for driving assistance. The examples described herein may also be used to provide lane information for fully autonomous driving to a processor, such as lane detector 220 or processor 1110 described herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of performing a method of detecting a lane.

FIG. 1 illustrates an example 100 of a situation where an ego vehicle 101 and surrounding vehicle(s) 103 are driving on a driving road 110.

The ego vehicle 101 may correspond to, for example, an intelligent vehicle equipped with an advanced driver assistance system (ADAS) and/or an autonomous driving (AD) system. The ADAS and/or AD system of the ego vehicle 101 may recognize some situations while the ego vehicle 101 is driving and may control an operation of the ego vehicle 101 or notify a driver of the situations. The ego vehicle 101 may obtain information related to lanes of the driving road 110 and relevant driving information that are recognized by the ADAS using for example, an image obtained from a camera and/or map information that is constructed in advance. In addition, the ego vehicle 101 may obtain various pieces of driving information, such as, for example, the recognized lanes on the driving road 110 through a navigation 120 provided in the vehicle.

Hereinafter, a vehicle may refer to any mode of transportation, delivery, or communication such as, for example, for example, an automobile, a truck, a tractor, a scooter, a motorcycle, a cycle, an amphibious vehicle, a snowmobile, a boat, a public transit vehicle, a bus, a monorail, a train, a tram, an autonomous vehicle, an unmanned aerial vehicle, a bicycle, a drone, and a flying object such as an airplane. A road may refer to a path where vehicles pass. The road may include various types of roads, such as an expressway, a national highway, a local road, a national expressway, a driveway, and the like. The road may include one or more lanes. The driving road 110 may refer to a road on which the ego vehicle 101 is driving.

The surrounding vehicle(s) 103 may refer to vehicles around the ego vehicle 101 and may be driven on the same driving road 110 on which the ego vehicle 101 is being driven. The surrounding vehicle(s) 103 that are being driven and stationary vehicles, trees, signs, and the like (not shown in FIG. 1) may be collectively referred to as "surrounding objects." Moving objects such as the surrounding vehicle(s) 103 that are being driven may be referred to as dynamic objects and stationary objects such as stationary vehicles, trees, signs, and the like may be referred to as static objects.

Figure 2:
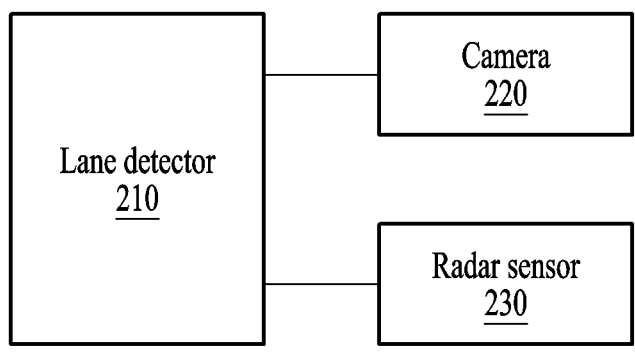
FIG. 2 illustrates an example of a lane detector.

According to an example, the ego vehicle 101 may include a lane detector (e.g., a lane detector 210 of FIG. 2). The lane detector may determine main trajectory information based on first trajectory information on one or more dynamic objects around the ego vehicle 101 and second trajectory information (or shape information) on a surrounding environment (e.g., a guardrail or wall) of the ego vehicle 101. The lane detector may determine one or more candidate lane templates from lane templates based on the main trajectory information. The lane detector may generate adjusted lane templates by adjusting (e.g., refining) the determined candidate lane templates. The lane detector may obtain lane features from a current frame and generate overlapping lane templates by overlapping the obtained lane features with each of the adjusted lane templates. The lane detector may determine an overlapping lane template having the highest score among the generated overlapping lane templates as a lane in the current frame.

Various situations may arise where it is difficult to use a high-definition map. These situation may arise for example, due to a malfunction of a global positioning system (GPS) or GPS signal reception failure, a road has changed but the change has not yet been reflected on the map information, a wrong lane feature being detected from an input image, a lane feature not being detected from the input image, a lane feature being detected from an input image but the amount of information not being large enough, etc. In such situations, the lane detector according to the examples described herein may stably determine (or detect) a lane and the ADAS/AD system of the ego vehicle 101 may stably perform or control the driving based on the determined lane.

FIG. 2 illustrates an example of a lane detector.

In some examples, the lane detector 210, a camera 220, and a radar sensor 230 of FIG. 2 may be included in the ADAS/AD system of a vehicle (e.g., the ego vehicle 101).

The camera 220 is, for example, a digital camera using a solid-state imaging device such as a charge coupled device (CCD) or a complementary metal oxide semiconductor (CMOS). In an example, the camera 220 may correspond to a sensor provided with an ultra-wide-angle lens. The camera may be installed in various positions in the vehicle 101. In an example, the camera 220 may be installed on a first position corresponding to a center of a front row to capture an image in front of the ego vehicle 101. In another example, the camera 220 may be installed on a second position corresponding to a center of a back row to capture an image behind the ego vehicle 101. In another example, the camera 220 may be installed on a third position corresponding to a side of the ego vehicle 101 to capture an image on a side of the ego vehicle 101. The camera 220 may, for example, periodically repeatedly capture images of the vicinity of the vehicle. The camera 220 may be a stereo camera or a trifocal camera.

The lane detector 210 may be a data processing device implemented by hardware including a circuit having a physical structure to perform desired operations. The hardware-implemented data processing device may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. In some examples, the lane detector 210 may be implemented as a part of a processor or controller, such as processor 1110, described below. Further details regarding the lane detector 210 is provided below.

The lane detector 210 may receive one or more input images from the camera 220. The input image may be a road image including one or more of one or more dynamic objects, one or more static objects, a lane, or a surrounding environment.

The lane detector 210 may obtain one or a plurality of input images for each frame by using the camera 220.

The lane detector 210 may receive radar data from the radar sensor 230. The radar sensor 230 may radiate a radar signal (e.g., a frequency modulated continuous wave (FMCW) signal) and may receive a reflected signal. Here, the reflected signal may indicate the radiated radar signal that is reflected by a surrounding object and/or surrounding environment. The radar sensor 230 may generate radar data based on the radar signal and the reflected signal. The radar sensor 230 may transmit the radar data to the lane detector 210.

The lane detector 210 may determine the first trajectory information (or dynamic trajectory information) on a dynamic object based on an input image obtained by the camera 220. The first trajectory information may include a moving path (or a driving path) of a dynamic object from a past time point to a current time point. The determination of the first trajectory information will be described in further details with reference to FIGS. 3 and 4.

The lane detector 210 may determine the second trajectory information (or static trajectory information) on the surrounding environment of the ego vehicle 101 based on the radar data. The second trajectory information may include a result of clustering static points having continuity (e.g., static points corresponding to a wall or guardrail) among static points extracted from the radar data. The determination of the second trajectory information will be described in further details with reference to FIGS. 5 and 6.

The lane detector 210 may determine the main trajectory information by using the determined first trajectory information and the determined second trajectory information. The lane detector 210, for example, may determine the main trajectory information by combining the determined first trajectory information with the determined second trajectory information. This will be described in further details with reference to FIG. 7.

The lane detector 210 may extract or obtain parameters related to line fitting from the main trajectory information. The parameters related to the line fitting may include coefficients and/or constants of a line fitting function (or a line fitting equation, for example, a polynomial function or linear function). For example, when the line fitting function is a quadratic function such as "ax2+bx+c", the parameters related to the line fitting may include a coefficient a, coefficient b, and constant c of the line fitting function.

In some examples, the lane detector 210 may extract or obtain one or more parameters related to the line fitting from the main trajectory information by performing random sample consensus (RANSAC) on the main trajectory information.

The lane detector 210 may determine a lane template having parameters similar to the extracted parameters from among the lane templates as a candidate lane template. The determination of the candidate lane template will be described in further details with reference to FIG. 8.

In some examples, the lane detector 210 may generate a plurality of adjusted lane templates by adjusting the candidate lane template. For example, the lane detector 210 may generate the adjusted lane templates by performing at least one of a transformation (e.g., a geometric transformation such as translation or rotation) or an adjustment considering a movement (e.g., pitch movement) of a camera of the ego vehicle 101 on the candidate lane template. In some examples, the lane detector 210 may generate the adjusted lane templates by performing resizing (or scaling) and/or reflection on the candidate lane template or by applying noise to the candidate lane template. In some examples, the reflection may indicate a geometric transformation to obtain a mirror image of the candidate lane template. The adjustment of the candidate lane template will be described in further details with reference to FIG. 9.

The lane detector 210 may obtain a lane feature based on an input image (e.g., an image of a current frame). For example, the lane detector 210 may obtain the lane feature (e.g., a segmented image corresponding to the lane) by performing image segmentation on the input image.

In some examples, the lane detector 210 may generate the overlapping lane templates by overlapping the lane feature with each of the adjusted lane templates. In some examples, the lane detector 210 may perform a bitwise AND operation on each of the adjusted lane templates and the obtained lane feature. In some examples, the lane detector 210 may determine the number of matching pixels between each of the adjusted lane templates and lane feature from a result of each bitwise AND operation. The lane detector 210 may determine each determined number as a score (or a matching score) of each of the overlapping lane templates. The lane detector 210 may determine an overlapping lane template having the highest score (or matching score) among the overlapping lane templates as a lane. This will be described in further details with reference to FIG. 10.

The ADAS/AD system of the ego vehicle 101 may perform operations (e.g., adaptive cruise control (ACC), autonomous emergency braking (AEB), lane keeping assistance (LKA), etc.) based on the lane that is determined.

Various situations may arise where it is difficult to use a high-definition map. These situation may arise for example, due to a malfunction of a global positioning system (GPS) or GPS signal reception failure, a road has changed but the change has not yet been reflected on the map information, a wrong lane feature is detected from an input image, a lane feature is not detected from an input image, a lane feature is detected from an input image but the amount of information is not large enough, etc. In this situation, the lane detector 210 (or the ADAS/AD system) may stably and reliably perform lane detection and enable the ego vehicle 101 to drive safely.

Figure 3:
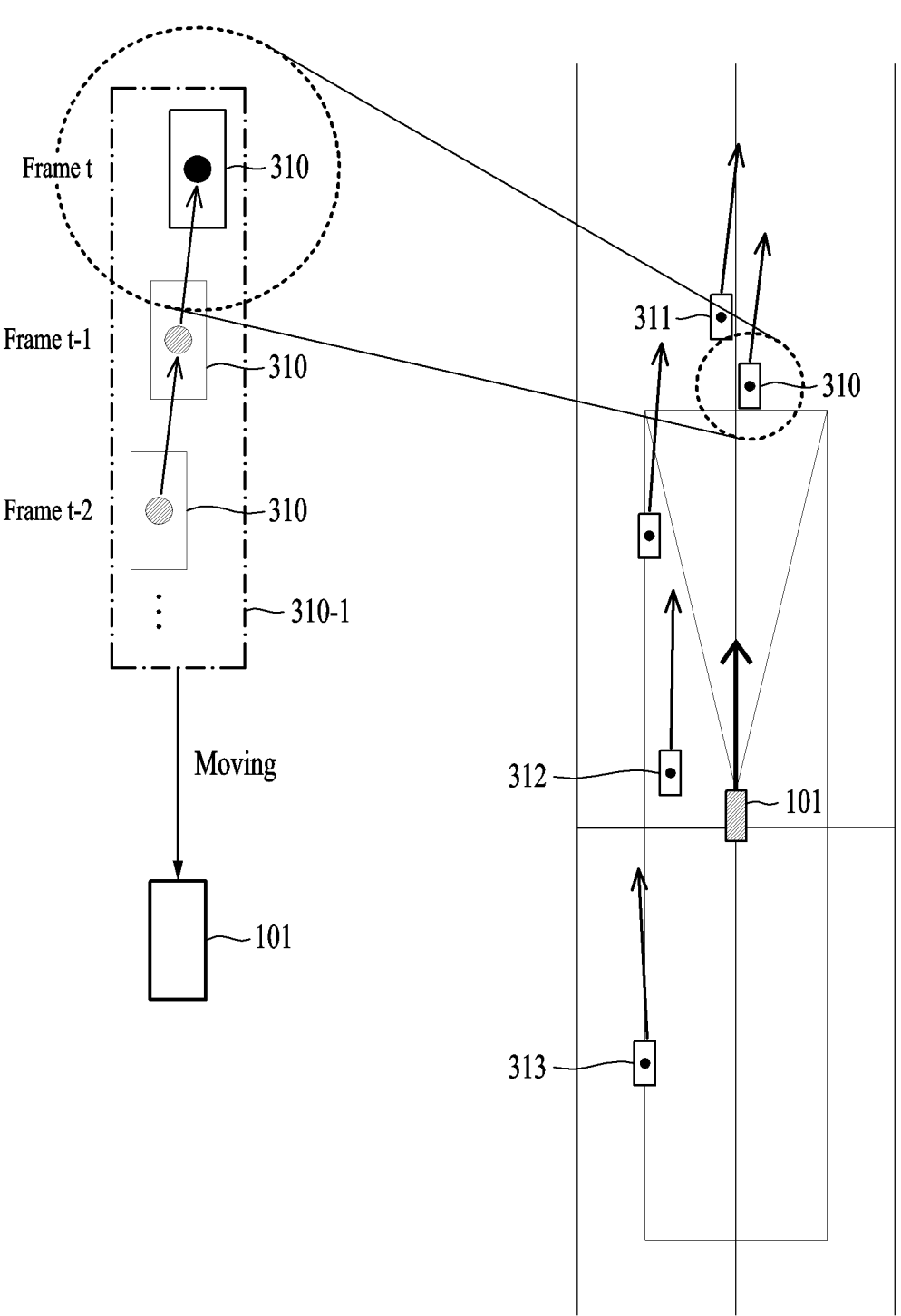
FIG. 3 illustrates an example of determining dynamic trajectory information by a lane detector.
Figure 4:
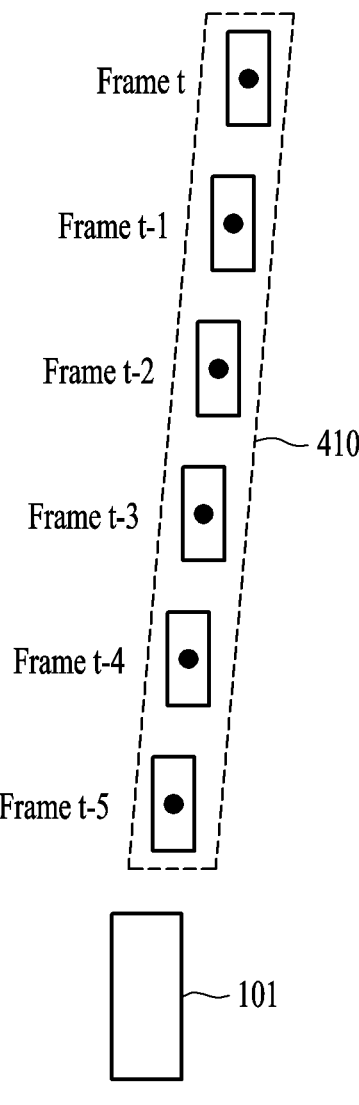
FIG. 4 illustrates an example of determining dynamic trajectory information by a lane detector.

FIGS. 3 and 4 illustrate examples of determining the dynamic trajectory information by the lane detector.

FIG. 3 illustrates an example of the ego vehicle 101 and surrounding vehicles 310, 311, 312, and 313.

The lane detector 210 may obtain an input image for each frame by using the camera 220.

The lane detector 210 may recognize the vehicles 310, 311, 312, and 313 from an input image of a frame t−2. The lane detector 210 may calculate a position (or coordinates) of each of the vehicles 310, 311, 312, and 313 in the frame t−2. The position of each of the vehicles 310, 311, 312, and 313 may include, for example, a relative position (or relative coordinates) of each of the vehicles 310, 311, 312, and 313 with respect to the ego vehicle 101, but is not limited thereto. In another example, the position of each of the vehicles 310, 311, 312, and 313 may include, for example, a relative position (or relative coordinates) of each of the vehicles 310, 311, 312, and 313 with respect to a static object recognized from the input image of frame t−2.

The lane detector 210 may recognize the vehicles 310, 311, 312, and 313 from an input image of a frame t−1. The lane detector 210 may calculate a position (or coordinates) of each of the vehicles 310, 311, 312, and 313 in the frame t−1.

The lane detector 210 may recognize the vehicles 310, 311, 312, and 313 from an input image of a frame t. The lane detector 210 may calculate a position (or coordinates) of each of the vehicles 310, 311, 312, and 313 in the frame t.

In the example shown in FIG. 3, the frame t may correspond to a current frame and the frames t−1 and frame t−2 may be frames at previous points of time.

The lane detector 210 may determine a driving trajectory of each of the vehicles 310, 311, 312, and 313 through the calculated position of each of the vehicles 310, 311, 312, and 313 in each frame, i.e., frame t, frame t−1, and frame t−2. The lane detector 210 may set the ego vehicle 101 as a reference point and move each determined driving trajectory to the ego vehicle 101 (that is, the reference point). In other words, the lane detector 210 may set the ego vehicle 101 as a reference point and translate the driving trajectory that is determined for each of the vehicles 310, 311, 312, and 313 using the ego vehicle 101 as a reference point. Since the vehicles 310, 311, 312, and 313 are at different positions on the road, the start positions of the determined driving trajectories of each of the vehicles 310, 311, 312, and 313 may be different from each other. For example, a start position of a driving trajectory 310-1 of the vehicle 310 may be different from the start positions of the respective driving trajectories of vehicles 311, 312, and 313. The lane detector 210 may move (or translate) the determined driving trajectories to the ego vehicle 101 set as the reference point, thereby obtaining the same start positions of the respective determined driving trajectories for each of the vehicles 310, 311, 312, and 313.

The lane detector 210 may determine an average driving trajectory of the moved driving trajectories. The lane detector 210 may aggregate the moved driving trajectories for each frame. An example of the average driving trajectory (or an aggregation result) is shown in FIG. 4. In the example shown in FIG. 4, when moving the determined driving trajectory of the vehicle 310 to the ego vehicle 101 set as the reference point, the lane detector 210 may also move the position (or the coordinates) of the vehicle 310 in each of the frames from frame t to frame t−5. In the same manner, when moving the determined driving trajectory of each of the vehicles 311, 312, and 313 to the ego vehicle 101 set as the reference point, the lane detector 210 may also move the position (or the coordinates) of each of the vehicles 311, 312, and 313 in each of the frames from frame t to frame t−5.

The lane detector 210 may calculate an average value of the moved positions (or the coordinates) of the vehicles 310, 311, 312, and 313 in the frame t−5, calculate an average value of the moved positions (or the coordinates) of the vehicles 310, 311, 312, and 313 in the frame t−4, and calculate an average value of the moved positions (or the coordinates) of the vehicles 310, 311, 312, and 313 in the frame t−3. The lane detector 210 may calculate an average value of the moved positions (or the coordinates) of the vehicles 310, 311, 312, and 313 in the frame t−2, calculate an average value of the moved positions (or the coordinates) of the vehicles 310, 311, 312, and 313 in the frame t−1, and calculate an average value of the moved positions (or the coordinates) of the vehicles 310, 311, 312, and 313 in the frame t. The lane detector 210 may calculate an average driving trajectory of the vehicles 310, 311, 312, and 313 through the calculated average values and may determine the average driving trajectory as first trajectory information (or dynamic trajectory information) 410 based on the vehicles 310, 311, 312, and 313.

Figure 5:
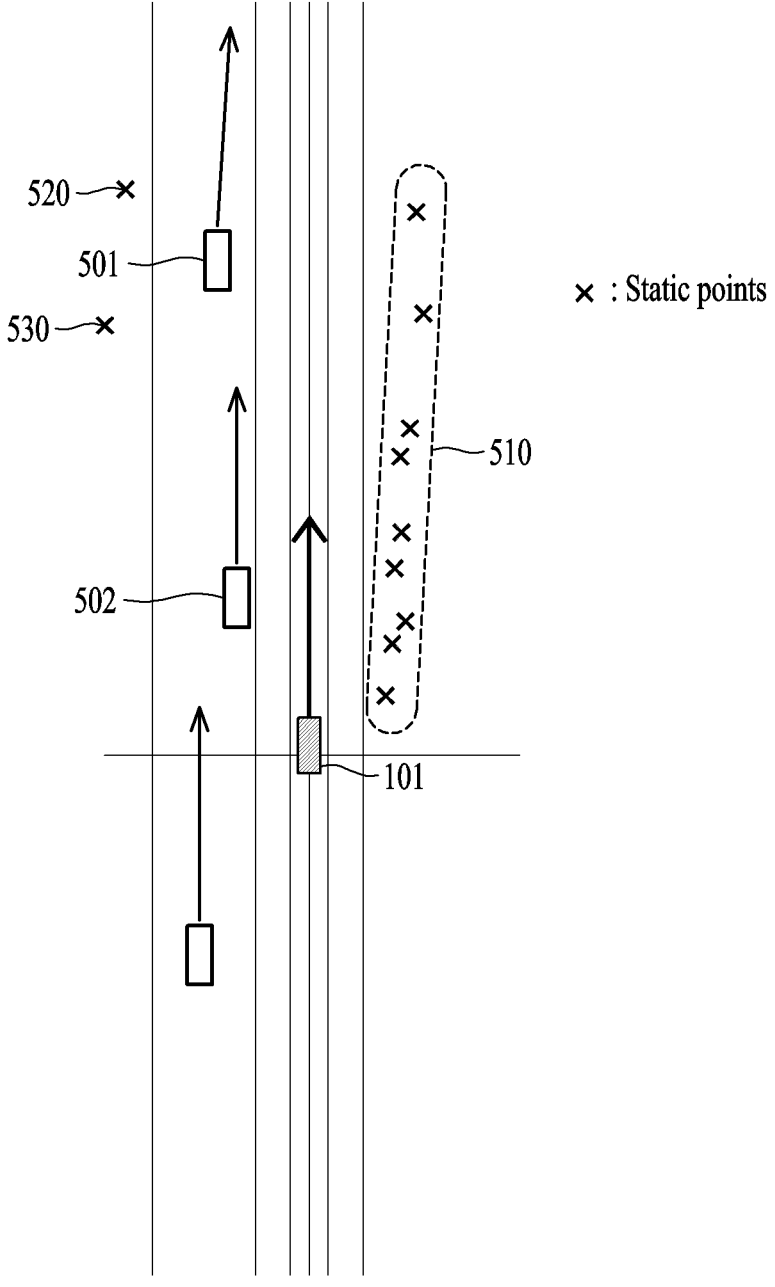
FIG. 5 illustrates an example of determining static trajectory information by a lane detector.
Figure 6:
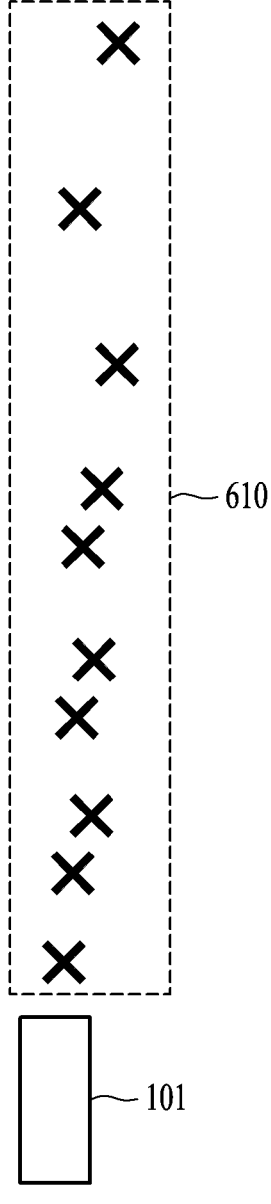
FIG. 6 illustrates an example of determining static trajectory information by a lane detector.

FIGS. 5 and 6 illustrate an example of determining static trajectory information by the lane detector.

Referring to FIG. 5, the radar sensor 230 of the ego vehicle 101 may radiate a radar signal. The radar signal may be reflected by dynamic objects (e.g., vehicles 501 and 502), static objects, and a surrounding environment and the radar sensor 230 may receive the reflected radar signal.

The radar sensor 230 may generate radar data by using the radar signal and the reflected radar signal and transmit the radar data to the lane detector 210.

The lane detector 210 may detect static points corresponding to a stationary state from the radar data. For example, the lane detector 210 may detect static points having a speed component of 0 from the radar data.

The lane detector 210 may cluster static points having continuity in a line shape among the detected static points. In the example shown in FIG. 5, the lane detector 210 may cluster the static points 510. The lane detector 210 may not cluster a static point 520 and a static point 530 because the static point 520 and the static point 530 do not correspond to static points having continuity in the line shape.

The lane detector 210 may move (or translate) the clustered points 510 to the ego vehicle 101 while maintaining the line shape of the clustered points 510. An example of a result of the movement is shown in FIG. 6. In the example shown in FIG. 6, the lane detector 210 may determine the moved static points 510 as second trajectory information (or shape information) 610 on the surrounding environment.

Figure 7:
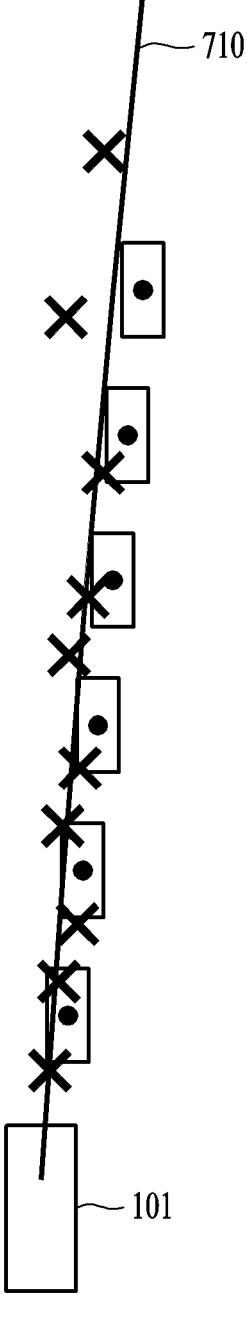
FIG. 7 illustrates an example of determining main trajectory information by a lane detector.

FIG. 7 illustrates an example of determining main trajectory information by the lane detector.

FIG. 7 shows the first trajectory information 410 described above with reference to FIG. 4 and the second trajectory information 610 described above with reference to FIG. 6.

The lane detector 210 may determine the main trajectory information by combining the first trajectory information 410 with the second trajectory information 610. A line 710 of FIG. 7 may be a fitting line of the main trajectory information.

Figure 8:
FIG. 8 illustrates an example of determining a candidate lane template by a lane detector.

FIG. 8 illustrates an example of determining a candidate lane template by the lane detector.

In an example, the lane detector 210 may extract parameters related to line fitting from the main trajectory information, an example of which is illustrated in FIG. 8. The lane detector 210 may determine a lane template having parameters similar to the extracted parameters as a candidate lane template from among a plurality of lane templates. An example of the plurality of lane templates is shown in FIG. 8.

The lane templates 800 shown in FIG. 8 may have parameters related to the line fitting or line shape information. The lane detector 210 may calculate or determine a similarity between the parameter extracted from the main trajectory information and the parameter related to the line fitting of each of the lane templates 800 illustrated in FIG. 8. In other words, the lane detector 210 may calculate or determine a similarity between the main trajectory information and the line shape information on each of the lane templates 800. For example, the lane detector 210 may calculate a distance (e.g., Euclidean distance, etc.) between the parameter extracted from the main trajectory information and the parameter related to the line fitting of each of the lane templates 800. The similarity between parameter extracted from the main trajectory information and the parameter related to the line fitting of each of the lane templates 800 may be calculated in other manners without deviating from the spirit and scope of the illustrated examples described.

In some examples, the lane detector 210 may compare each calculated similarity (e.g., each calculated distance) with a threshold value. The lane detector 210 may determine or select a lane template having a similarity equal or more than the threshold value from among the lane templates 800 as the candidate lane template. In the example shown in FIG.

8, the lane detector 210 may calculate a similarity (or a distance) between a parameter related to the line fitting of a lane template #1 810 and the parameter extracted from main trajectory information as "N1." The lane detector 210 may calculate a similarity (or a distance) between a parameter related to the line fitting of a lane template #2 820 and the parameter extracted from main trajectory information as "N2". The lane detector 210 may calculate a similarity (or a distance) between a parameter related to the line fitting of a lane template #3 830 and the parameter extracted from main trajectory information as "N3." The lane detector 210 may calculate a similarity (or a distance) between a parameter related to the line fitting of a lane template #4 840 and the parameter extracted from main trajectory information as "N4." The lane detector 210 may calculate a similarity (or a distance) between a parameter related to the line fitting of a lane template #5 850 and the parameter extracted from main trajectory information as "N5". If N4 is equal to or more than the threshold value from among N1 to N5, the lane detector 210 may determine the lane template #4 840 as the candidate lane template. The lane template #4 840 may have line shape information similar to the main trajectory information (or the fitting line 710 of the main trajectory information).

In another example, the lane detector 210 may determine a plurality of lane templates that are equal to or more than the threshold to be the candidate lane templates. For example, when the N4 and N5 are greater than the threshold, the lane detector 210 may determine the lane template #4 840 and lane template #5 850 as the candidate lane templates.

Figure 9:
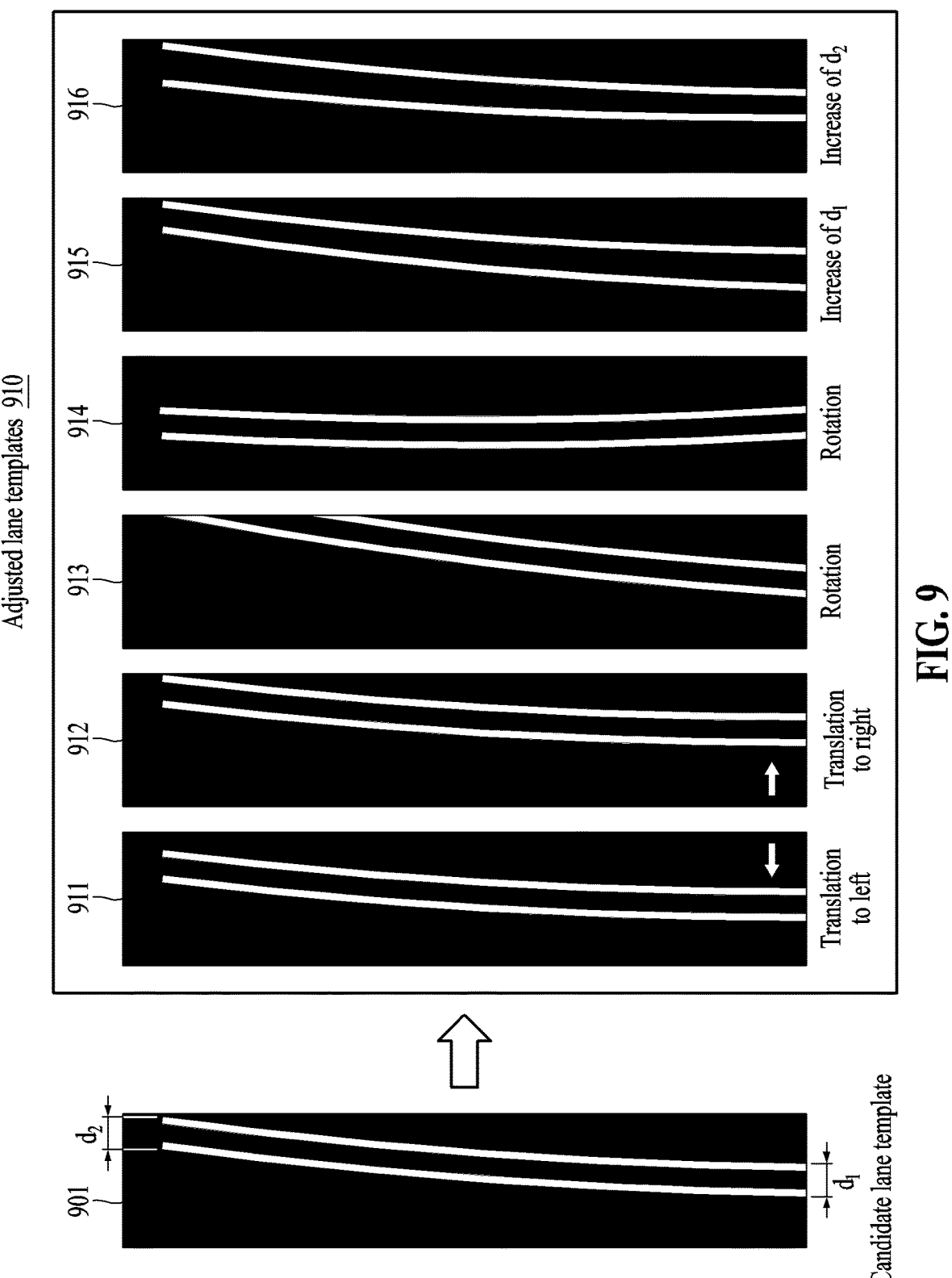
FIG. 9 illustrates an example of adjusting a candidate lane template by a lane detector.

FIG. 9 illustrates an example of adjusting the candidate lane template by the lane detector.

FIG. 9 shows a candidate lane template 901 (e.g., the lane template #4 840 of FIG. 8).

Although FIG. 9 shows one candidate lane template 901, this is merely an example, and the lane detector 210 may determine or select a plurality of candidate lane templates.

The lane detector 210 may generate a plurality of adjusted lane templates (e.g., adjusted lane templates 910 of FIG. 9) by adjusting (e.g., refining) the candidate lane template 901.

In an example, the lane detector 210 may generate one or more adjusted lane templates by performing transformation (e.g., translation, rotation, etc.) on the candidate lane template 901.

For example, the lane detector 210 may generate one or more adjusted lane templates (e.g., moved lane templates) by performing translation on the candidate lane template 901. In some examples, the lane detector 210 generates an adjusted lane template 911 by translating the candidate lane template 901 to the left by a translation value. In some examples, the lane detector 210 generates an adjusted lane template 912 by translating the candidate lane template 901 to the right by a translation value. In some examples, the lane detector 210 generates adjusted lane templates different from the adjusted lane templates 911 and 912 by translating the candidate lane template 901 by changing the translation value.

For example, the lane detector 210 may generate one or more adjusted lane templates (e.g., rotated lane templates) by performing translation on the candidate lane template 901. In some examples, the lane detector 210 generates an adjusted lane template 913 by rotating the candidate lane template 901 by a first angle. In some examples, the lane detector 210 generates an adjusted lane template 914 by rotating the candidate lane template 901 by a second angle. In some examples, the lane detector 210 generates adjusted lane templates different from the adjusted lane templates 913 and 914 by rotating the candidate lane template 901 by various angles.

Although not shown in FIG. 9, the lane detector 210 may generate one or more adjusted lane templates by performing resizing (or scaling) and/or reflection on the candidate lane template or by applying noise to the candidate lane template.

In an example, the lane detector 210 may generate one or more adjusted lane templates by performing adjustment considering a movement (e.g., a pitch movement) of the camera of the ego vehicle 101.

In some examples, the lane detector 210 generates an adjusted lane template 915 by adjusting the candidate lane template 901 in consideration of the state of the camera that is rotated toward the ground by a pitch angle. The lane detector 210 may generate the adjusted lane template 915 by increasing a first lane width (d1) and decreasing a second lane width (d2) of the candidate lane template 901. As the pitch angle increases, the first lane width (d1) may increase and the second lane width (d2) may decrease.

In some examples, the lane detector 210 may generate an adjusted lane template 916 by adjusting the candidate lane template 901 in consideration of the state of the camera that is rotated toward the sky by a pitch angle. The lane detector 210 may generate the adjusted lane template 916 by decreasing the first lane width (d1) and increasing the second lane width (d2) of the candidate lane template 901. As the pitch angle increases, the second lane width (d2) may increase and the first lane width (d1) may decrease.

In addition to the adjustment described with reference to FIG. 9, the lane detector 210 may generate adjusted lane templates by performing various other geometric transformations on the candidate lane template 901 without deviating from the spirit and scope of the illustrated examples described.

Figure 10:
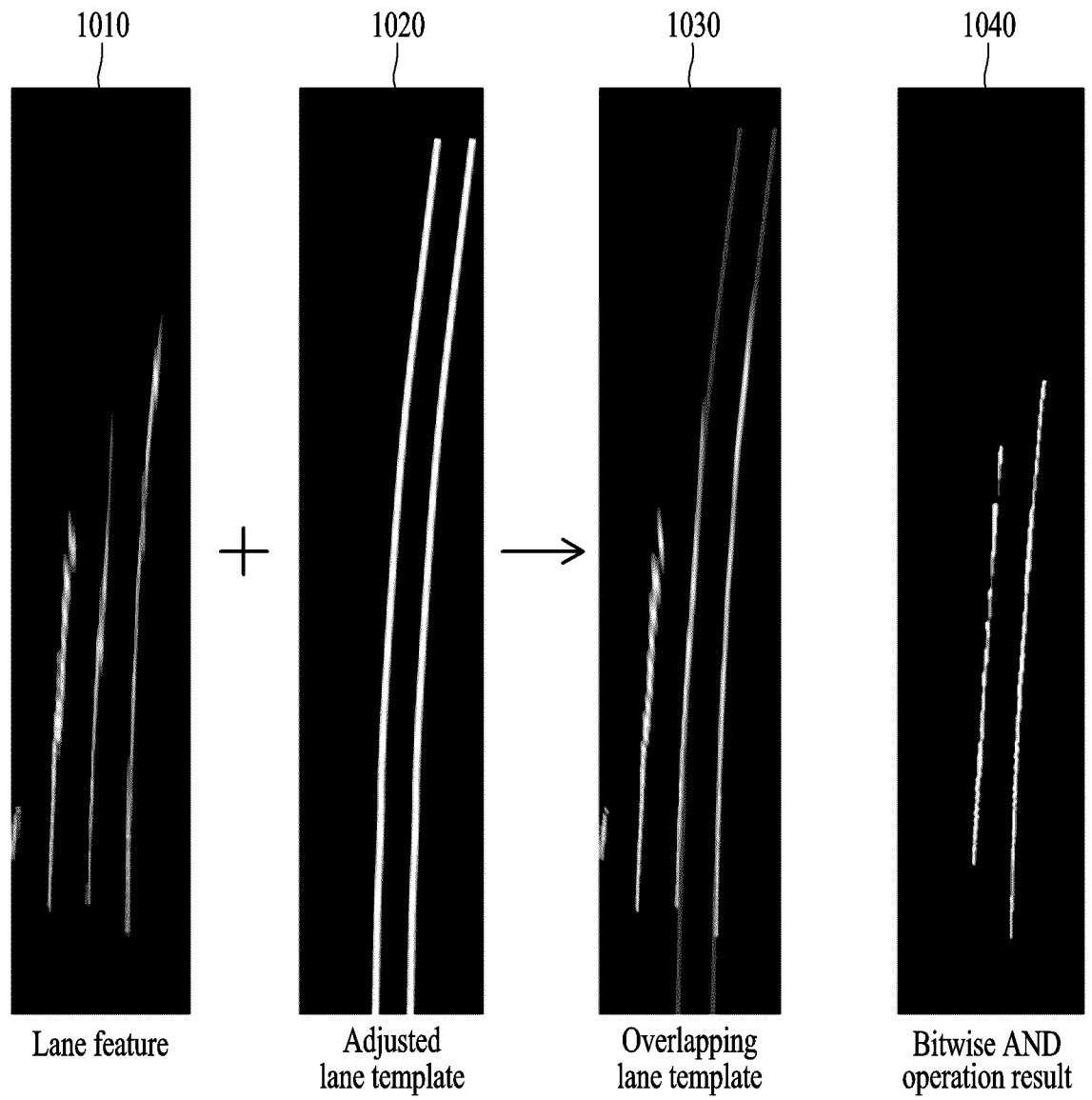
FIG. 10 illustrates an example of determining a lane by a lane detector.

FIG. 10 illustrates an example of determining a lane by the lane detector.

FIG. 10 shows a lane feature (e.g., a segmented image corresponding to a lane) 1010 and an adjusted lane template 1020.

The lane detector 210 may obtain the lane feature 1010 by performing image segmentation on the current frame (e.g., the frame t).

The lane detector 210 may determine a similarity between the lane feature 1010 and each of a plurality of adjusted lane templates through the overlapping of the lane feature 1010 with each of the plurality of adjusted lane templates.

In an example, the lane detector 210 may generate a plurality of overlapping lane templates by overlapping the lane feature 1010 with each of the plurality of adjusted lane templates (e.g., the adjusted lane templates 910 of FIG. 9). For example, the lane detector 210 may generate an overlapping lane template 1030 by overlapping the lane feature 1010 with the adjusted lane template 1020. Although not shown in FIG. 10, overlapping lane templates may be generated by overlapping the lane feature 1010 with each of the remaining adjusted lane templates.

The lane detector 210 may perform the bitwise AND operation on the adjusted lane template 1020 and the lane feature 1010. A result of the bitwise AND operation 1040 of the adjusted lane template 1020 and the lane feature 1010 is shown in FIG. 10. The lane detector 210 may calculate a score (or a matching score) of the overlapping lane template 1030 based on the result of bitwise AND operation 1040. For example, the lane detector 210 may determine the number of matching pixels between the adjusted lane template 1020 and the lane feature 1010 from the result of the bitwise AND operation 1040 and determine the determined number as the score (or the matching score) of the overlapping lane template 1030. The score of the overlapping lane template 1030 may correspond to a similarity between the adjusted lane template 1020 and the lane feature 1010. Similarly, the lane detector 210 may perform the bitwise AND operation on each of remaining adjusted lane templates and the lane feature 1010. The lane detector 210 may calculate a score (or a matching score) of each of the remaining overlapping lane templates based on each bitwise AND operation result.

According to some examples, the lane detector 210 may generate the overlapping lane template by overlapping the candidate lane template 901 with the lane feature 1010 and perform the bitwise AND operation on the candidate lane template 901 and the lane feature 1010. The lane detector 210 may calculate a score (or a matching score) of the overlapping lane template based on the bitwise AND operation result.

The lane detector 210 may determine, as the lane, the overlapping lane template 1030 in which the lane feature 1010 has the greatest similarity with the adjusted lane template. The lane detector 210 may determine, as the lane, the overlapping lane template having the highest score from among the calculated scores. For example, when the score of the overlapping lane template 1030 is the highest among the overlapping lane templates, the lane detector 210 may determine the overlapping lane template 1030 as a lane in the frame t.

In some examples, the lane detector 210 may determine whether a lane type is changed after the lane is determined. The lane detector 210 may determine first trajectory information on one or more dynamic objects based on an input image of a next frame (e.g., the frame t+1). The lane detector 210 may determine second trajectory information on the surrounding environment from the radar data. The lane detector 210 may determine the main trajectory information (hereinafter, referred to as "second main trajectory information") by combining the first trajectory information with the second trajectory information. The lane detector 210 may extract a parameter related to the line fitting from the second main trajectory information and determine whether a difference between the extracted parameter and a parameter related to the line fitting of the overlapping lane template (e.g., the overlapping lane template 1030) in the frame t is equal to or more than a threshold value. When the difference described above is less than the threshold value, the lane detector 210 may determine that the lane type is not changed and continue to use the overlapping lane template, which has been used as the lane in the frame t, as a lane in the frame t+1. When the difference described above is equal to or more than the threshold value, the lane detector 210 may determine that the lane type is changed. For example, the lane detector 210 may determine (or detect) that the lane type is changed from a straight section to a curved section.

When it is determined that the lane type is changed, the lane detector 210 may determine one or more candidate lane templates (hereinafter, referred to as "second candidate lane templates") among lane templates (e.g., the lane templates 800 of FIG. 8) based on the second main trajectory information. When it is determined that the lane type is changed, the lane detector 210 may add an overlapping lane template used as the lane in the frame t to the lane templates (e.g., the lane templates 800 of FIG. 8). Accordingly, a lane template reflecting actual road features during the driving may be generated and stored.

The lane detector 210 may generate adjusted lane templates (hereinafter, referred to as "second adjusted lane templates") by adjusting the second candidate lane template.

The lane detector 210 may obtain a lane feature from an input image (hereinafter, referred to as a second input image) of the frame t+1 and generate overlapping lane templates (hereinafter, referred to as "second overlapping lane templates") by overlapping the obtained lane feature with each of the second adjusted lane features.

The lane detector 210 may determine the second overlapping lane template having the highest score among the second overlapping lane templates as the lane in the frame t+1.

Figure 11:
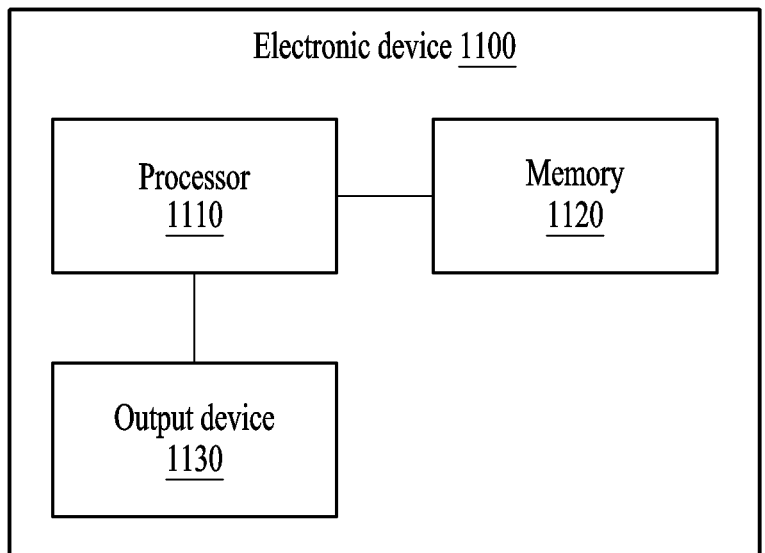
FIG. 11 illustrates an example of an electronic device.

FIG. 11 illustrates an example of an electronic device.

An electronic device 1100 of FIG. 11 may implement the lane detector 210 or the ADAS/AD system of the ego vehicle 101.

Referring to FIG. 11, the electronic device 1100 may include a processor 1110, a memory 1120, and an output device 1130.

The processor 1110 may perform the operations of the lane detector 210. The processor 1110 may control an overall operation of the electronic device 1100 and may execute corresponding processor-readable instructions for performing operations of the electronic device 1100. The processor 1110 may execute, for example, software, to control one or more hardware components, such as other components described below in FIG. 2, of the electronic device 1100 connected to the processor 1110 and may perform various data processing or operations, and control of such components.

In an example, as at least a part of data processing or operations, the processor 1110 may store instructions or data in the memory 1120, execute the instructions and/or process data stored in the memory 1120, and store resulting data obtained therefrom in the memory 1120. The processor 1110 may be a data processing device implemented by hardware including a circuit having a physical structure to perform desired operations. For example, the desired operations may include code or instructions included in a program.

The hardware-implemented data processing device 1110 may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 1110 are provided below.

The memory 1120 may store a plurality of lane templates (e.g., the lane templates 800 of FIG. 8). The memory 1120 may store a computing result or operation result of the processor 1110.

The memory 1120 may store a variety of data used by components (e.g., the processor 1110) of the electronic device 1100. A variety of data may include, for example, computer-readable instructions and input data or output data for an operations related thereto. The memory 1120 may include any one or any combination of a volatile memory and a non-volatile memory.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 1120 are provided below.

The processor 1110 may determine main trajectory information based on first trajectory information on one or more dynamic objects around the vehicle (e.g., the ego vehicle 101) and second trajectory information on the surrounding environment of the vehicle.

The processor 1110 may determine one or more candidate lane templates (e.g., the candidate lane template 901 of FIG. 9) among lane templates stored in the memory 1120 based on the determined main trajectory information.

The processor 1110 may generate adjusted lane templates (e.g., the adjusted lane templates 910 of FIG. 9) by adjusting the determined candidate lane templates.

The processor 1110 may determine a similarity (e.g., a score) between a lane feature and each of the generated adjusted lane templates through the overlapping of the lane feature (e.g., the lane feature 1010 of FIG. 10) obtained based on an input image (e.g., the input image of the current frame) with each of the generated adjusted lane templates. For example, the processor 1110 may determine the number of matching pixels between each of the generated adjusted lane templates and the lane feature, and determine the determined number of pixels as the similarity between the lane feature and each of the generated adjusted lane templates.

The processor 1110 may determine, as the lane, an overlapping lane template (e.g., the overlapping lane template 1030 of FIG. 10) in which the lane feature overlaps with the adjusted lane template having the greatest similarity with the lane feature.

The processor 1110 may determine whether a lane type is changed based on second main trajectory information that is determined after the lane is determined and the overlapping lane template corresponding to the determined lane. When it is determined that the lane type is changed, the processor 1110 may determine one or more second candidate lane templates among the lane templates based on the determined second main trajectory information. The processor 1110 may generate second adjusted lane templates by adjusting the determined second candidate lane templates. The processor 1110 may determine a similarity (e.g., a score) between a second lane feature and each of the generated second adjusted lane templates through the overlapping of the second lane feature obtained based on a second input image with each of the generated second adjusted lane templates. The processor 1110 may determine, as the lane, the second overlapping lane template in which the second lane feature overlaps with the second adjusted lane template having the greatest similarity with the second lane feature.

In some examples, the processor 1110 may output the lanes to the output device 1130. In some examples, the output device 1130 may provide an output of the speech to a user through auditory, visual, or tactile channel. The output device 1130 may include, for example, a speaker, a display, a touchscreen, a vibration generator, and other devices that may provide the user with the output. The output device 1130 is not limited to the example described above, and any other output device, such as, for example, computer speaker and eye glass display (EGD) that are operatively connected to the electronic device 1100 may be used without departing from the spirit and scope of the illustrative examples described. In an example, the output device 1130 is a physical structure that includes one or more hardware components that provide the ability to render a user interface, output information and speech, and/or receive user input.

The examples described above with reference to FIGS. 1 to 10 may be applied to the electronic device 1100 of FIG. 11.

Figure 12:
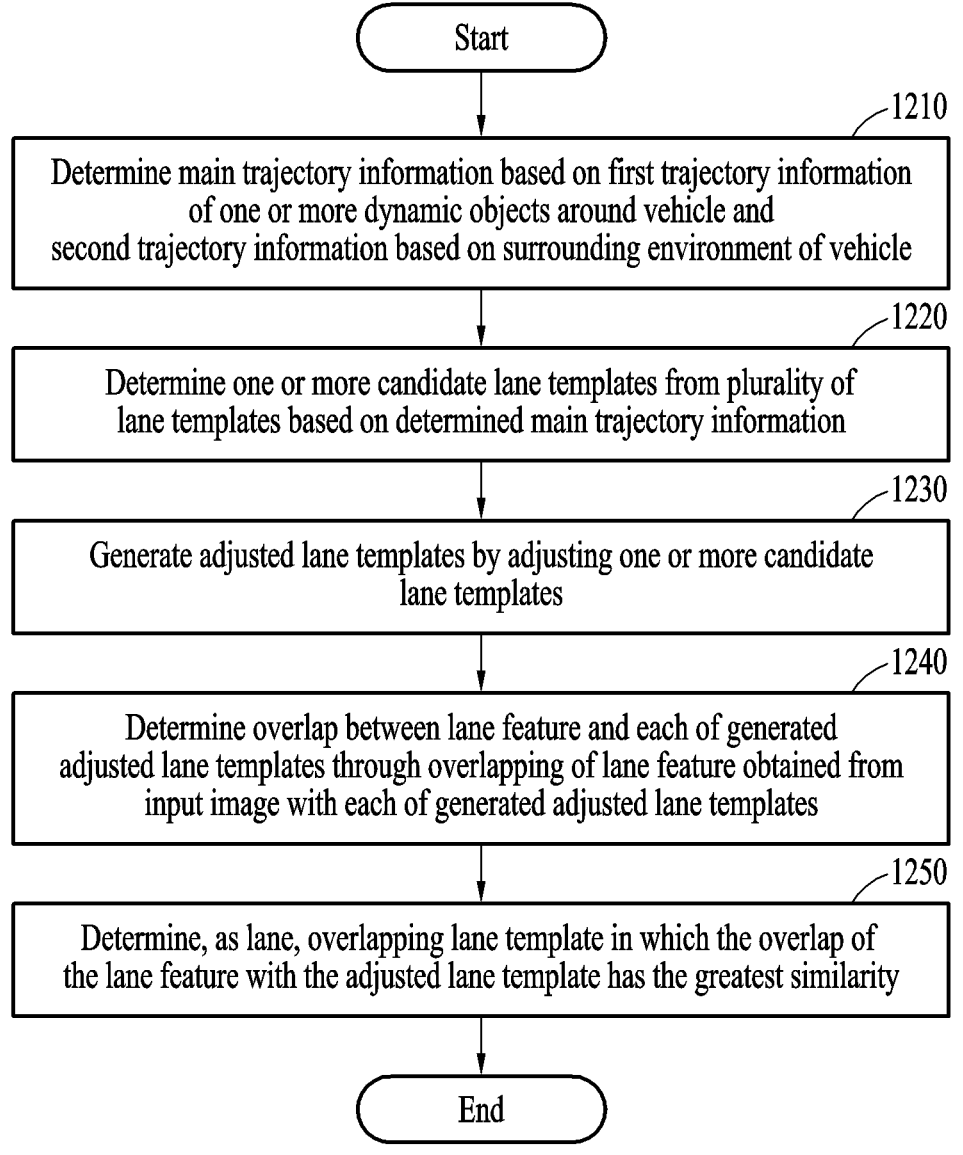
FIG. 12 illustrates an example of a method of detecting a lane.

FIG. 12 illustrates an example of a method of detecting a lane. The operations of FIG. 12 may be performed in the sequence and manner as shown. However, the order of some operations may be changed, or some of the operations may be omitted, without departing from the spirit and scope of the shown example. Additionally, operations illustrated in FIG. 12 may be performed in parallel or simultaneously. One or more blocks of FIG. 12, and combinations of the blocks, can be implemented by special purpose hardware-based computer that perform the specified functions, or combinations of special purpose hardware and instructions, e.g., computer or processor instructions. For example, operations of the method may be performed by a computing apparatus (e.g., processor 1110 in FIG. 11). In addition to the description of FIG. 12 below, the descriptions of FIGS. 1-11 are also applicable to FIG. 12 and are incorporated herein by reference. Thus, the above description may not be repeated here for brevity purposes.

The method of detecting a lane of FIG. 12 may be performed by the electronic device 1100 of FIG. 11 or some combination of the lane detector 210, a camera 220, and a radar sensor 230 of FIG. 2.

Referring to FIG. 12, in operation 1210, the electronic device 1100 may determine main trajectory information based on first trajectory information of one or more dynamic objects around a vehicle (e.g., the ego vehicle 101) and second trajectory information based on a surrounding environment of the vehicle.

In operation 1220, the electronic device 1100 may determine one or more candidate lane templates from lane templates based on the determined main trajectory information.

In operation 1230, the electronic device 1100 may generate adjusted lane templates by adjusting the one or more candidate lane templates.

In operation 1240, the electronic device 1100 may determine an overlap between a lane feature and each of the generated adjusted lane templates through the overlapping of the lane feature obtained from an input image with each of the generated adjusted lane templates.

In operation 1250, the electronic device 1100 may determine, as the lane, the overlapping lane template in which the overlap of the lane feature with the adjusted lane template has the greatest similarity.

The examples described above with reference to FIGS. 1 to 11 may be applied to the method of detecting a lane of FIG. 12.

The lane detector 210, computing apparatuses, the electronic devices, the processors, the memories, and other components described herein with respect to FIGS. 2 and 11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for detecting a lane, the method comprising:
   determining main trajectory information based on first trajectory information of one or more dynamic objects around a vehicle and second trajectory information of a surrounding environment of the vehicle;
   determining one or more candidate lane templates from among lane templates based on the main trajectory information;
   adjusting the one or more candidate lane templates to generate adjusted lane templates;
   determining an overlap between a lane feature obtained from an input image and each of the adjusted lane templates through overlapping the lane feature with each of the adjusted lane templates;
   determining, as the lane, an overlapping lane template in which an overlap of the lane feature with an adjusted lane template has a greatest similarity; and
   performing automated driving operations for the vehicle based on the determined lane.

2. The method of claim 1, wherein the determining of the main trajectory information comprises:
   determining the main trajectory information by combining the first trajectory information with the second trajectory information.

3. The method of claim 1, further comprising:
   in response to a plurality of dynamic objects being recognized, determining a movement path of each of the plurality of dynamic objects; and
   determining the first trajectory information based on each of the determined movement path.

4. The method of claim 1, further comprising:
   detecting static points corresponding to a stationary state from radar data obtained through a radar sensor;
   performing clustering on points having continuity from among the detected static points; and
   determining the second trajectory information based on the clustering.

5. The method of claim 1, wherein the determining of the one or more candidate lane templates comprises:
   extracting a parameter related to line fitting from the main trajectory information; and
   selecting one or more lane templates having a parameter similar to the extracted parameter from among the lane templates as the one or more candidate lane templates.

6. The method of claim 1, wherein the generating of the adjusted lane templates comprises:
   generating the adjusted lane templates by performing at least one of a transformation or an adjustment, based on a movement of a camera of the vehicle, on the one or more candidate lane templates.

7. The method of claim 1, wherein the determining of the overlap comprises:
   determining a number of matching pixels between each of the adjusted lane templates and the lane feature; and
   determining a similarity of the lane feature and each of the generated adjusted lane templates based on the number of matching pixels.

8. The method of claim 1, further comprising:
   determining whether a lane type is changed based on second main trajectory information determined after the lane is determined and the adjusted lane template;
   determining one or more second candidate lane templates from among the lane templates based on the second main trajectory information, in response to the lane type being changed;

adjusting the one or more second candidate lane templates to generate second adjusted lane templates;

determining an overlap between a second lane feature obtained from a second input image and each of the second adjusted lane templates through overlapping the second lane feature with each of the second adjusted lane templates; and determining, as a second lane, a second overlapping lane template in which an overlap of the second lane feature with a second adjusted lane template has a greatest similarity.

9. The method of claim 8, wherein the determining of whether the lane type is changed comprises:

extracting a parameter related to line fitting from the second main trajectory information;

determining whether a difference between a parameter related to the line fitting of the adjusted lane template and the extracted parameter is equal to or greater than a threshold; and determining that the lane type is changed, in response to the difference being equal to or greater than the threshold.

10. The method of claim 8, further comprising:

maintaining the overlapping lane template as the lane, in response to the determining of the lane type not being changed.

11. The method of claim 8, further comprising adding the overlapping lane template to the lane templates, in response to the determining of the lane type being changed.

12. An electronic device comprising:

a memory configured to store instructions and lane templates; and a processor configured to execute the instructions to configure the processor to determine main trajectory information based on first trajectory information of one or more dynamic objects around a vehicle and second trajectory information of a surrounding environment of the vehicle;

determine one or more candidate lane templates from among the lane templates based on the main trajectory information;

adjust the one or more candidate lane templates to generate adjusted lane templates;

determine an overlap between a lane feature obtained from an input image and each of the adjusted lane templates through overlapping the lane feature with each of the adjusted lane templates;

determine, as a lane, an overlapping lane template in which an overlap of the lane feature with an adjusted lane template has a greatest similarity; and perform automated driving operations for the vehicle based on the determined lane.

13. The device of claim 12, wherein the processor is further configured to:

determine the main trajectory information by combining the first trajectory information with the second trajectory information.

14. The device of claim 12, wherein the processor is further configured to:

in response to a plurality of dynamic objects being recognized, determine a movement path of each of the plurality of dynamic objects, and to determine the first trajectory information by aggregating the movement path of each of the plurality of dynamic objects.

15. The device of claim 12, wherein the processor is further configured to:

receive radar data from a radar sensor of the vehicle;

detect static points corresponding to a stationary state from the received radar data;

cluster points having continuity from among the detected static points; and determine the second trajectory information based on the clustered points.

16. The device of claim 12, wherein the processor is further configured to:

extract a parameter related to line fitting from the main trajectory information; and select one or more lane templates having a parameter similar to the extracted parameter from among the lane templates as the one or more candidate lane templates.

17. The device of claim 12, wherein the processor is further configured to:

generate the adjusted lane templates by performing at least one of a transformation or an adjustment, based on a movement of a camera of the vehicle, on the one or more candidate lane templates.

18. The device of claim 12, wherein the processor is further configured to:

determine a number of matching pixels between each of the adjusted lane templates and the lane feature; and determine a similarity of the lane feature and each of the generated adjusted lane templates based on the number of matching pixels.

19. The device of claim 12, wherein the processor is further configured to:

determine whether a lane type is changed based on second main trajectory information determined after the lane is determined and the adjusted lane template;

determine one or more second candidate lane templates from among the lane templates based on the second main trajectory information, in response to the lane type being changed, adjust the one or more second candidate lane templates to generate second adjusted lane templates;

determine an overlap between a second lane feature obtained from a second input image and each of the second adjusted lane templates through overlapping the second lane feature with each of the second adjusted lane templates; and determine, as a second lane, a second overlapping lane template in which an overlap of the second lane feature with a second adjusted lane template has a greatest similarity.

20. The device of claim 19, wherein the processor is further configured to:

extract a parameter related to line fitting from the second main trajectory information;

determine whether a difference between a parameter related to the line fitting of the adjusted lane template and the extracted parameter is equal to or greater than a threshold value; and determine that the lane type is changed, in response to the difference being equal to or greater than the threshold value.

* * * * *